(12) United States Patent
Chen et al.

(10) Patent No.: US 12,205,028 B2
(45) Date of Patent: Jan. 21, 2025

(54) CO-DISENTAGLED SERIES/TEXT MULTI-MODAL REPRESENTATION LEARNING FOR CONTROLLABLE GENERATION

(71) Applicant: NEC Laboratories America, Inc., Princeton, NJ (US)

(72) Inventors: Yuncong Chen, Plainsboro, NJ (US); Zhengzhang Chen, Princeton Junction, NJ (US); Xuchao Zhang, Elkridge, MD (US); Wenchao Yu, Plainsboro, NJ (US); Haifeng Chen, West Windsor, NJ (US); LuAn Tang, Pennington, NJ (US); Zexue He, La Jolla, CA (US)

(73) Assignee: NEC Corporation, Tokyo (JP)

( * ) Notice: Subject to any disclaimer, the term of this patent is extended or adjusted under 35 U.S.C. 154(b) by 302 days.

(21) Appl. No.: 17/958,597

(22) Filed: Oct. 3, 2022

(65) Prior Publication Data
US 2023/0109729 A1    Apr. 13, 2023

Related U.S. Application Data

(60) Provisional application No. 63/253,169, filed on Oct. 7, 2021, provisional application No. 63/308,081, filed on Feb. 9, 2022.

(51) Int. Cl.
*G06F 40/30*    (2020.01)
*G06F 40/47*    (2020.01)
*G06N 3/08*    (2023.01)

(52) U.S. Cl.
CPC ............... *G06N 3/08* (2013.01); *G06F 40/30* (2020.01); *G06F 40/47* (2020.01)

(58) Field of Classification Search
CPC .................. G06F 40/47; G06F 40/30
(Continued)

(56) References Cited

U.S. PATENT DOCUMENTS 10,789,755 B2 *  9/2020  Amer ..................... G06V 20/41
11,294,756 B1 *  4/2022  Sadrieh ................. G06N 3/047
(Continued)

FOREIGN PATENT DOCUMENTS

KR    1020190109108 A    9/2019

OTHER PUBLICATIONS

M. Lee and V. Pavlovic, "Private-Shared Disentangled Multimodal VAE for Learning of Latent Representations," 2021 IEEE/CVF Conference on Computer Vision and Pattern Recognition Workshops (CVPRW), Nashville, TN, USA, 2021, pp. 1692-1700, doi: 10.1109/CVPRW53098.2021.00185. keywords: {Computer vision;C (Year: 2021).*

(Continued)

*Primary Examiner* — Bharatkumar S Shah
(74) *Attorney, Agent, or Firm* — Joseph Kolodka

(57) ABSTRACT

A computer-implemented method for multi-model representation learning is provided. The method includes encoding, by a trained time series (TS) encoder, an input TS segment into a TS-shared latent representation and a TS-private latent representation. The method further includes generating, by a trained text generator, a natural language text that explains the input TS segment, responsive to the TS-shared latent representation, the TS-private latent representation, and a text-private latent representation.

20 Claims, 11 Drawing Sheets

(58) Field of Classification Search
USPC .......................................................... 704/2
See application file for complete search history.

(56) References Cited

U.S. PATENT DOCUMENTS

| | | | |
|---|---|---|---|
| 2007/0078564 A1 | 4/2007 | Hoshino et al. | |
| 2008/0208565 A1 | 8/2008 | Bisegna | |
| 2018/0165554 A1* | 6/2018 | Zhang | G06N 3/045 |
| 2019/0278489 A1 | 9/2019 | Saito et al. | |
| 2020/0364596 A1 | 11/2020 | Zang et al. | |
| 2021/0133590 A1* | 5/2021 | Amroabadi | G06N 3/04 |
| 2022/0108082 A1* | 4/2022 | Morris | G06F 16/382 |

OTHER PUBLICATIONS

O. T.. -C. Chen, Y. H. Tsai, C. W. Su, P. C. Kuo and W. C. Lai, "Voice-activity home care system," 2016 IEEE-EMBS International Conference on Biomedical and Health Informatics (BHI), Las VegaUSA, 2016, pp. 110-113, doi: 10.1109/BHI.2016.7455847. keywords: {Noise reduction; Speaker recognition year2016 (Year: 2016).*

Cheng, P., Hao, W., Dai, S., Liu, J., Gan, Z., & Carin, L. (Nov. 21, 2020). Club: A contrastive log-ratio upper bound of mutual information. In International conference on machine learning (pp. 1779-1788). PMLR.

Edunov, S., Ott, M., Auli, M., & Grangier, D. (Aug. 28, 2018). Understanding back-translation at scale. arXiv preprint arXiv:1808.09381.

Kim, H., & Mnih, A. (Jul. 3, 2018). Disentangling by factorising. In International Conference on Machine Learning (pp. 2649-2658). PMLR.

Kudo, T., & Richardson, J. (Aug. 19, 2018). Sentencepiece: A simple and language independent subword tokenizer and detokenizer for neural text processing. arXiv preprint arXiv:1808.06226.

Nguyen, X., Wainwright, M. J., & Jordan, M. (Dec. 3, 2007). Estimating divergence functionals and the likelihood ratio by penalized convex risk minimization. Advances in neural information processing systems, 20.

Qin, Y., Song, D., Chen, H., Cheng, W., Jiang, G., & Cottrell, G. (Apr. 7, 2017). A dual-stage attention-based recurrent neural network for time series prediction. arXiv preprint arXiv:1704.02971.

Vaswani, A., Shazeer, N., Parmar, N., Uszkoreit, J., Jones, L., Gomez, A. N., . . . & Polosukhin, I. (Dec. 4, 2017). Attention is all you need. Advances in neural information processing systems, 30.

* cited by examiner

Input time series - 410:

Generated text - 420:
The time series data is formed by square wave.
The overall amplitude is decreasing over time.
The frequency of the signal is stable over time.
... the overall amplitude is decreasing over time....
... the overall amplitude is decreasing over time....
... the overall amplitude is stable over time....

Traversal over a latent dimension - 430:

CO-DISENTAGLED SERIES/TEXT MULTI-MODAL REPRESENTATION LEARNING FOR CONTROLLABLE GENERATION

RELATED APPLICATION INFORMATION

This application claims priority to U.S. Provisional Patent Application No. 63/253,169, filed on Oct. 7, 2021, and U.S. Provisional Patent Application No. 63/308,081, filed on Feb. 9, 2022, incorporated herein by reference in their entireties.

BACKGROUND

Technical Field

The present invention relates to machine learning and more particularly to co-disentangled time series/text multi-modal representation learning for controllable generation.

Description of the Related Art

Time series data are prevalent in the IoT era. For instance in industrial monitoring, a large number of sensor streams constitute complex time series. Machine learning software are developed to automatically detect and classify time series patterns. However, compared to natural language comments from human experts, the output of AI software are usually simple 1-of-N labels which cannot cover the multitude of aspects the operators want to know about the data. This lack of comprehensiveness and naturalness in feedbacks has hindered the adoption of AI time series analytics in the industrial field.

SUMMARY

According to aspects of the present invention, a computer-implemented method for multi-model representation learning is provided. The method includes encoding, by a trained time series (TS) encoder, an input TS segment into a TS-shared latent representation and a TS-private latent representation. The method further includes generating, by a trained text generator, a natural language text that explains the input TS segment, responsive to the TS-shared latent representation, the TS-private latent representation, and a text-private latent representation.

According to other aspects of the present invention, a computer program product for multi-model representation learning is provided. The computer program product includes a non-transitory computer readable storage medium having program instructions embodied therewith. The program instructions are executable by a computer to cause the computer to perform a method. The method includes encoding, by a trained time series (TS) encoder, an input TS segment into a TS-shared latent representation and a TS-private latent representation. The method further includes generating, by a trained text generator, a natural language text that explains the input TS segment, responsive to the TS-shared latent representation, the TS-private latent representation, and a text-private latent representation.

According to still other aspects of the present invention, a computer processing system for multi-model representation learning is provided. The computer processing system includes a memory device for storing program code. The computer processing system further includes a hardware processor operatively coupled to the memory device for running the program code to encode, using a trained time series (TS) encoder, an input TS segment into a TS-shared latent representation and a TS-private latent representation; The hardware processor further runs the program code to generate, using a trained text generator, a natural language text that explains the input TS segment, responsive to the TS-shared latent representation, the TS-private latent representation, and a text-private latent representation.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to co-disentangled time series/text multi-modal representation learning for controllable generation.

Embodiments of the present invention utilize text-annotated time series data (e.g. obtained from maintenance records) to train a neural network model that generates readable and accurate explanatory texts given a time series segment (e.g., from IoT sensor streams). In addition, the factors of variations in the data of both modalities are automatically identified to make the generation process interpretable and controllable. This is achieved by a novel architecture based on multimodal variational autoencoder and a novel training objective called "co-disentanglement". The goal is to implement a virtual expert that helps operators better understand their domain time series data and make more informed decisions. As used herein, the term "private", as in TS-private or text-private means that the referred information or features are uniquely contained in one of the TS or text modalities and not the other. Also, the term "shared", as in TS-shared or text-shared means that the referred information or features are common to both the TS and text modalities.

Figure 1:
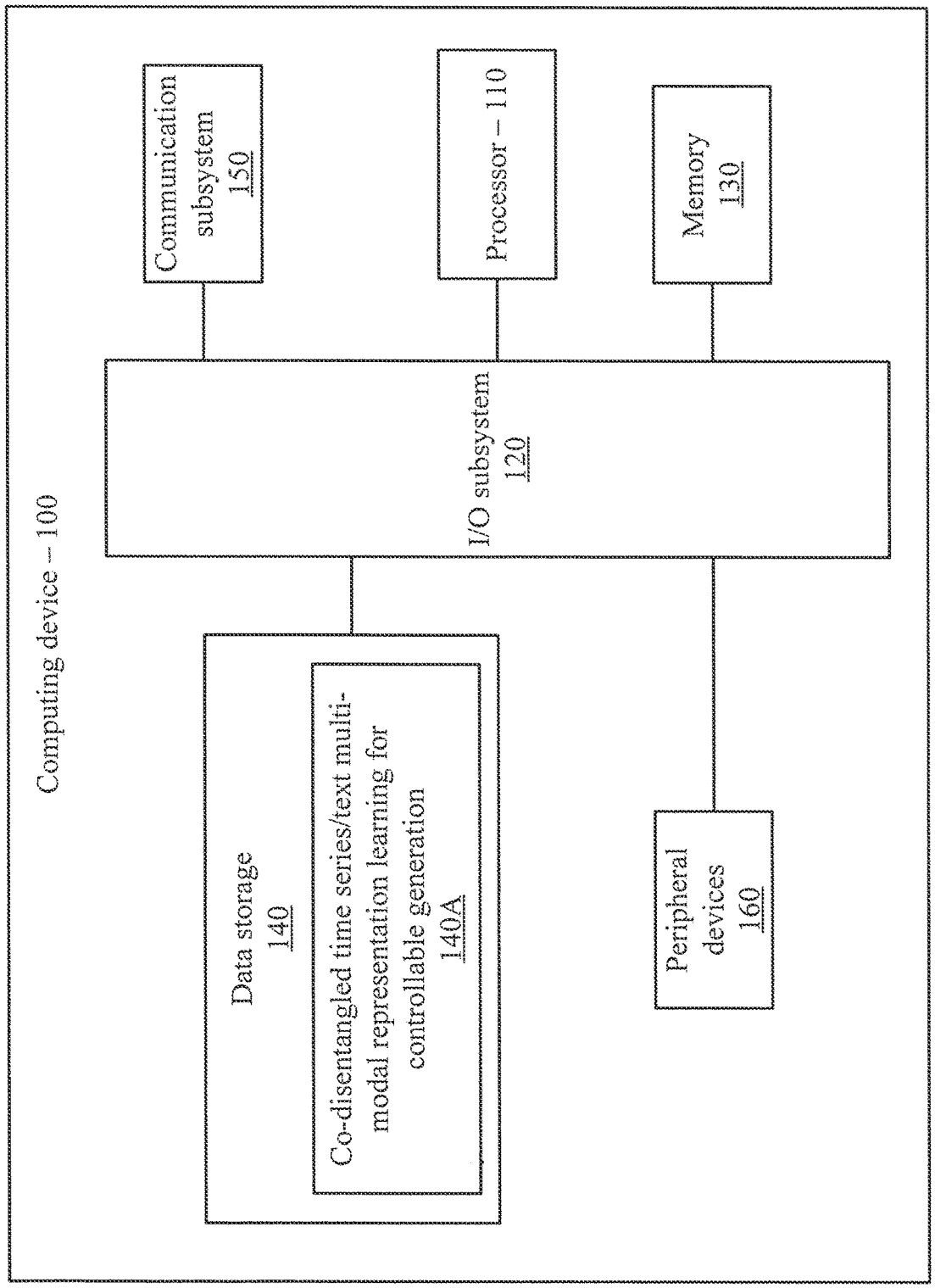
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform co-disentangled time series/text multi-modal representation learning for controllable generation.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for co-disentangled time series/text multi-modal representation learning for controllable generation. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
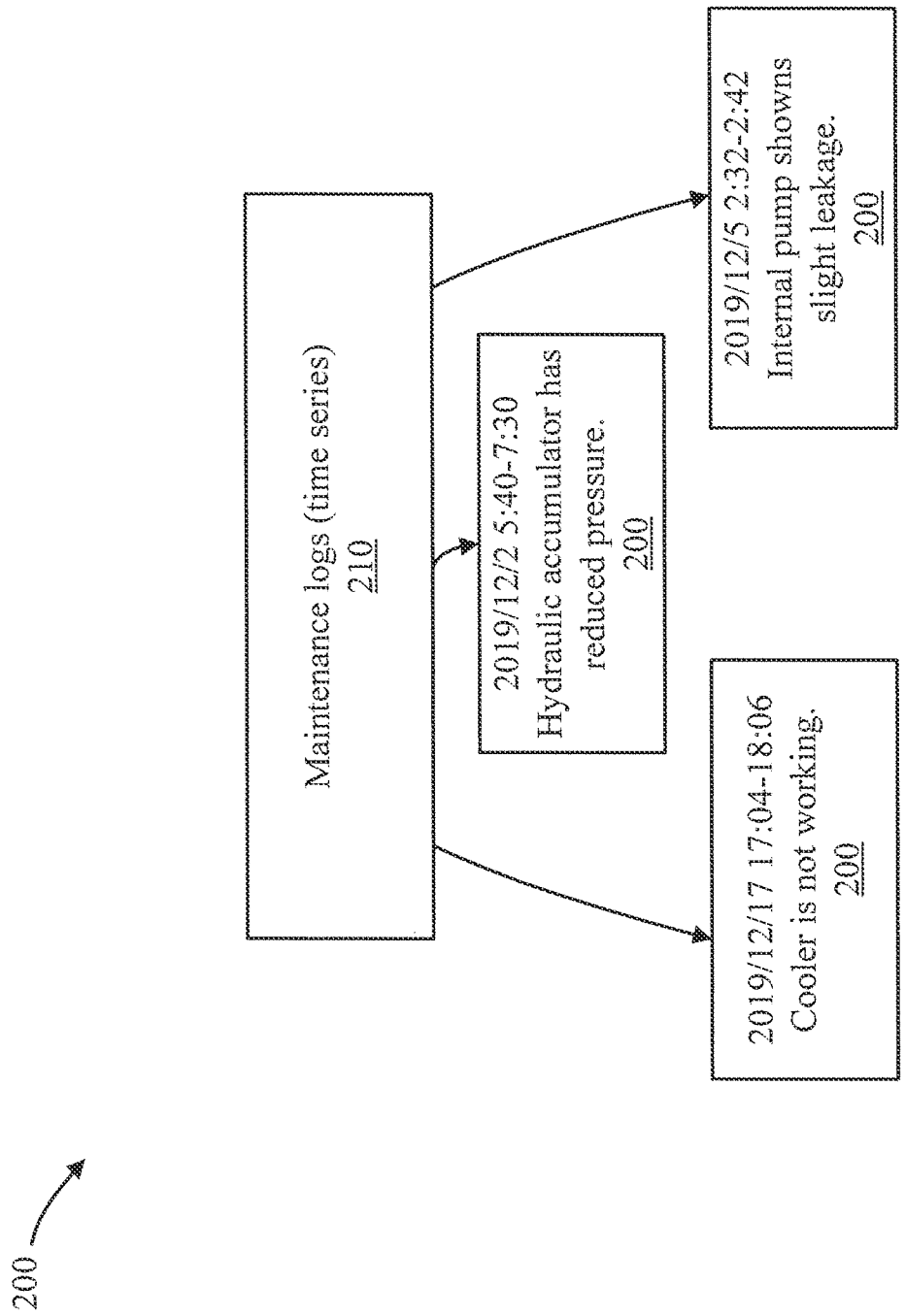
FIG. 2 shows an exemplary text-annotated time series dataset derived from maintenance logs and time series historian software, in accordance with an embodiment of the present invention.

These and other variations of a hardware processor subsystem are also contemplated in accordance with embodiments of the present invention FIG. 2 shows an exemplary text-annotated time series dataset 200 derived from maintenance logs 210 and time series historian software, in accordance with an embodiment of the present invention.

From the text-annotated time series dataset 200, one can extract synchronized pairs of time series segments and natural language texts. This allows learning of domain-specific relationships between time series and texts to facilitate domain data understanding and staff training. No existing analytics system utilizes such multimodal data jointly, despite their informativeness and the high cost of acquiring them.

A description will now be given regarding an embodiment of the present invention.

Figure 6:
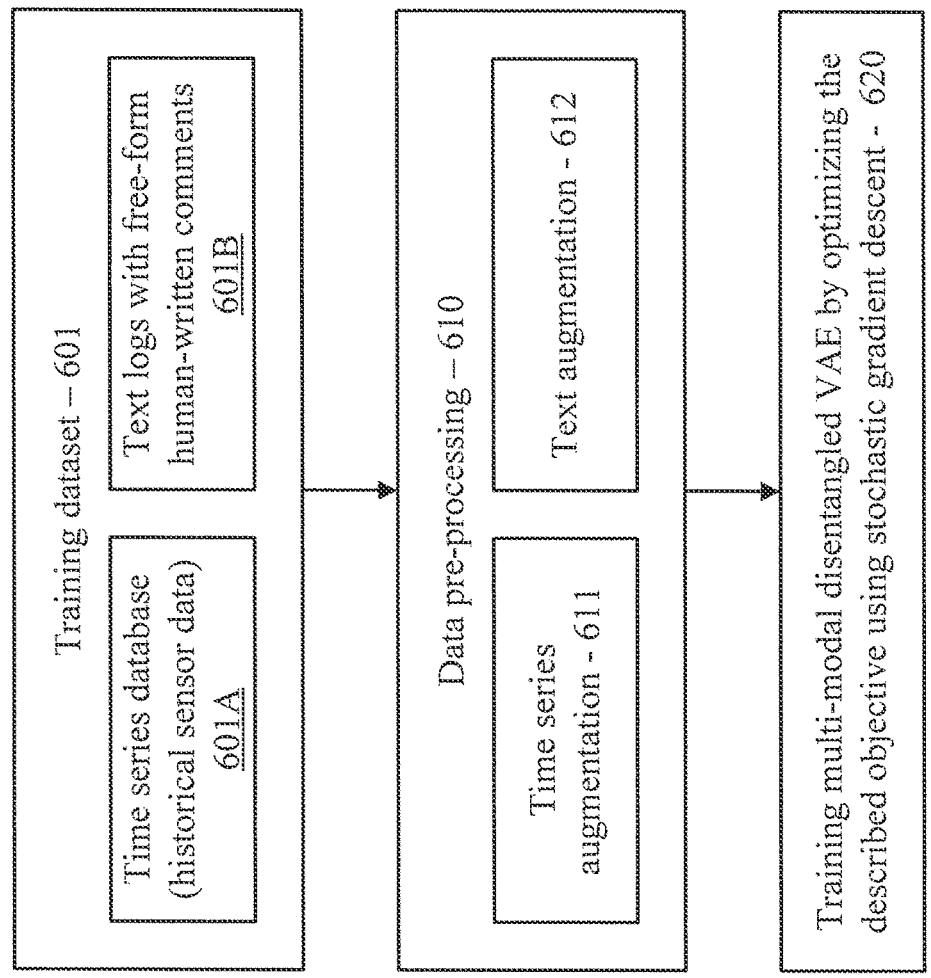
FIG. 6 is a diagram showing an exemplary training procedure, in accordance with an embodiment of the present invention.
Figure 7:
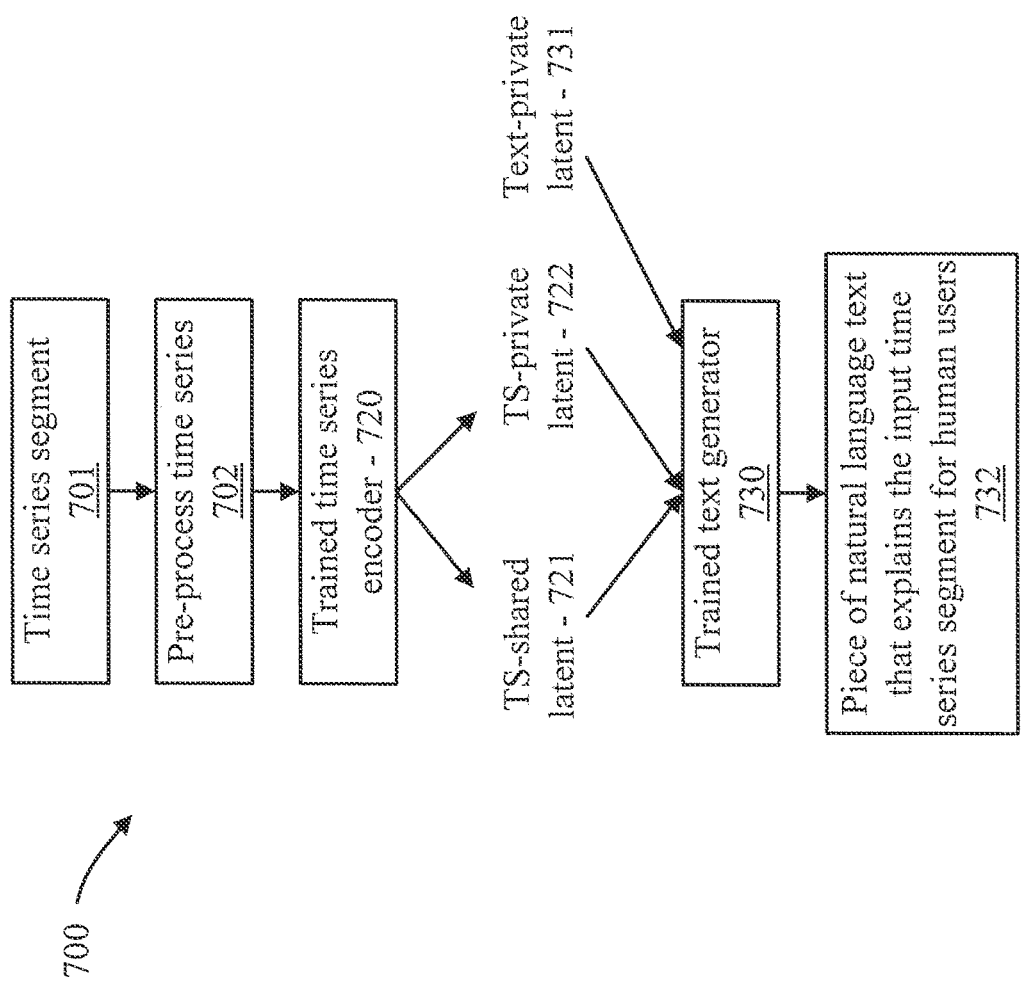
FIG. 7 is a diagram showing an exemplary first use case, in accordance with an embodiment of the present invention.
Figure 8:
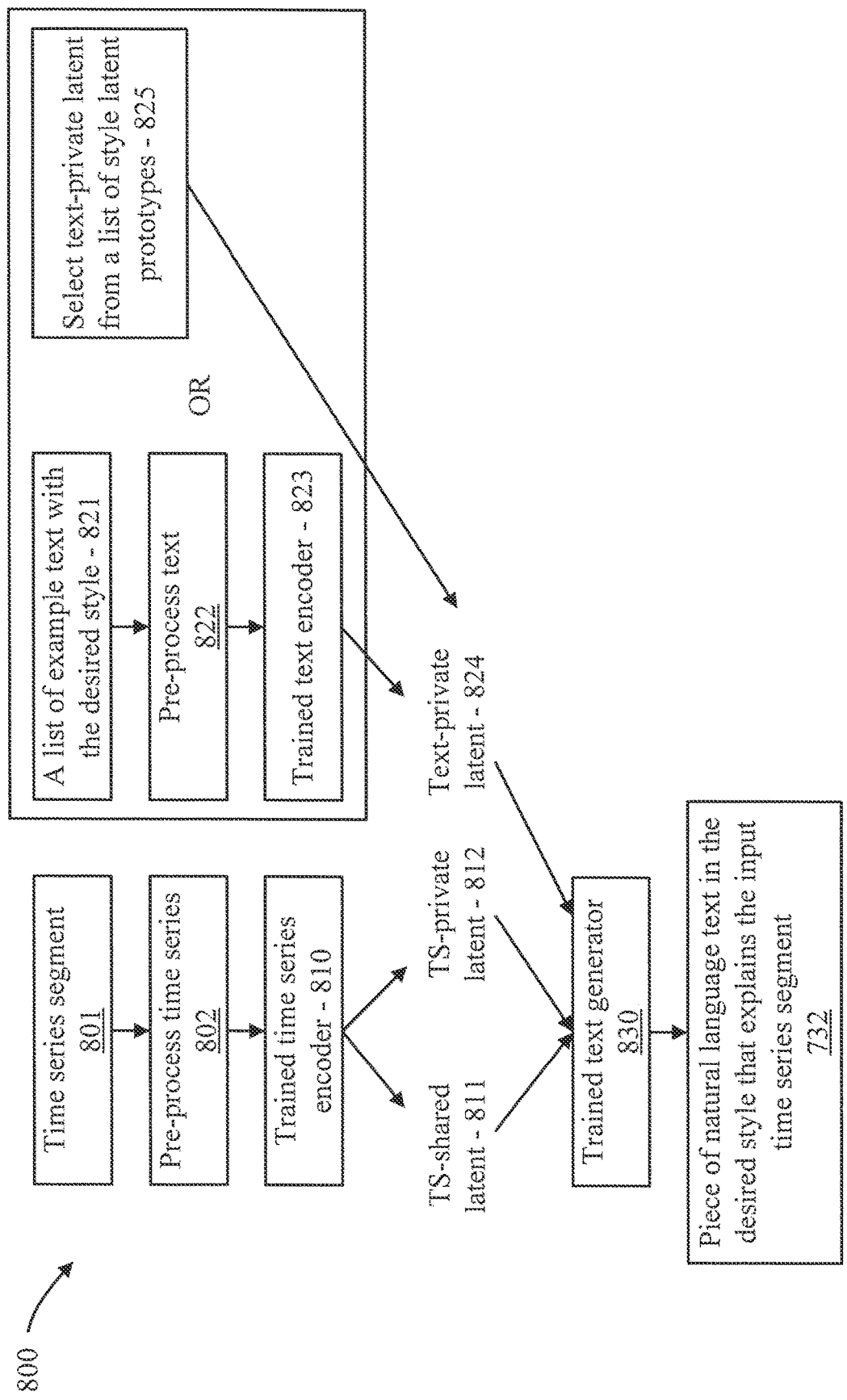
FIG. 8 is a diagram showing an exemplary second use case, in accordance with an embodiment of the present invention.
Figure 9:
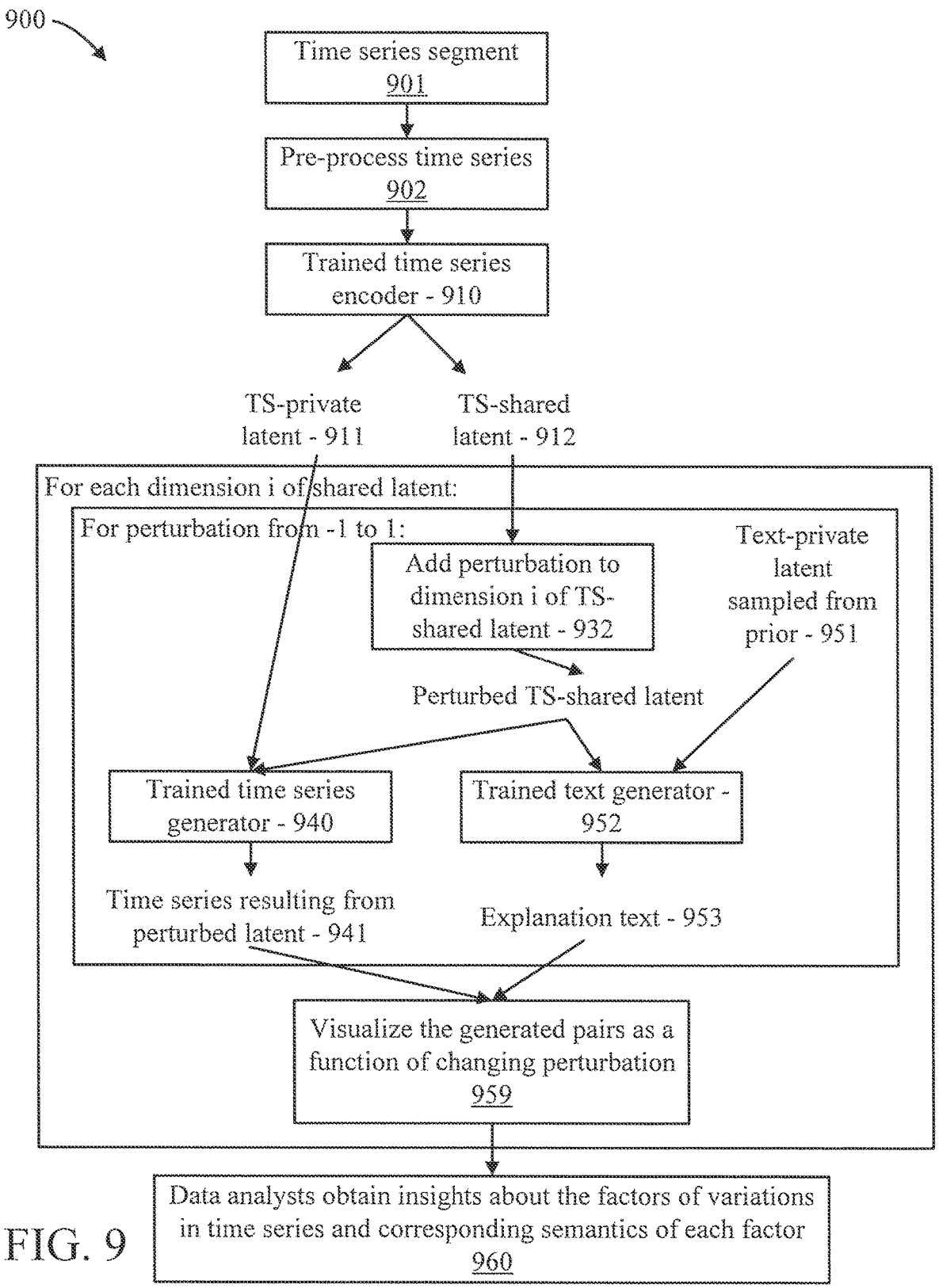
FIG. 9 is a diagram showing an exemplary third use case, in accordance with an embodiment of the present invention.

First, a dataset comprising pairs of time series segments and free-form comment texts is used to train the model (FIG. 6). The time series can be either univariate or multi-variate. Then at test time, the trained model takes a potentially unseen time series as input, and generates texts that can be used as interpretation or explanation of the input. The user can run the model repeatedly, and each time the model will generate a different text, explaining the input in different ways (FIG. 7). A reference text can be optionally provided as input to impose the style of the generated text (FIG. 8). An example usage of this system is in FIG. 2. The user can further obtain explanation of the factors of variations in the data using the proposed latent dimension traversal procedure (FIGS. 4 and 9).

Figure 3:
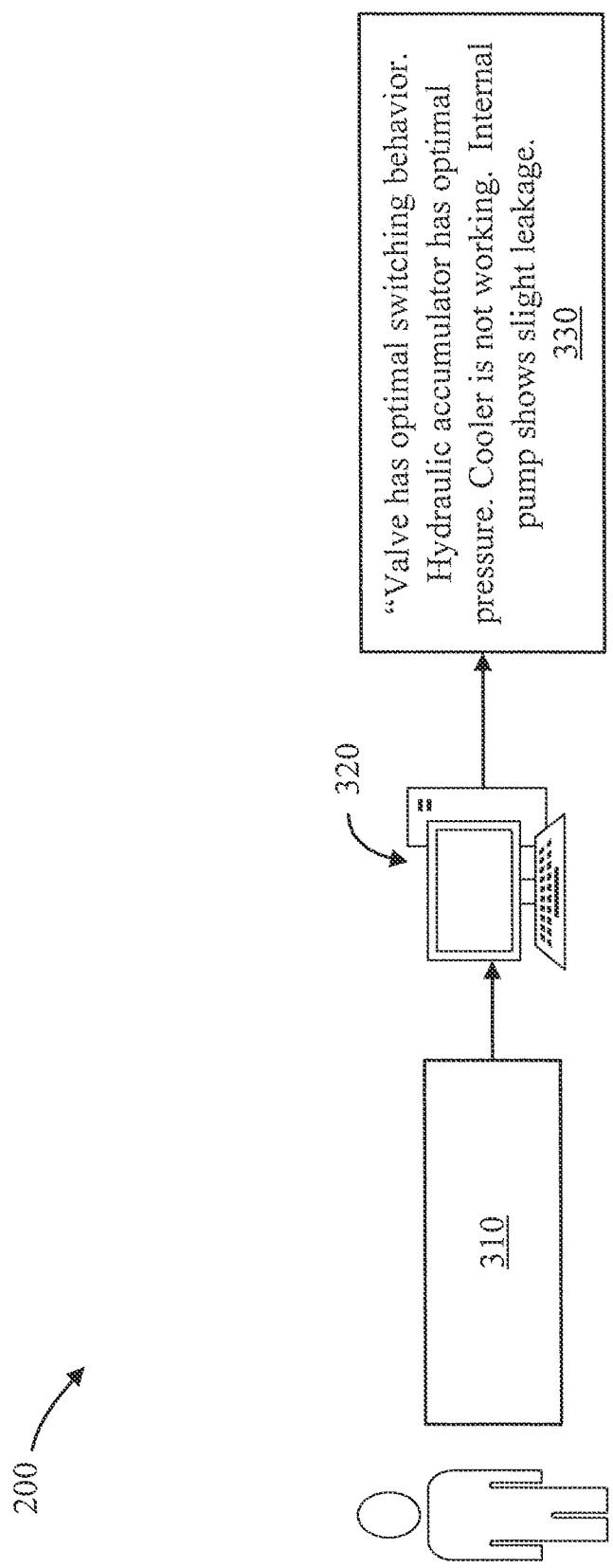
FIG. 3 is a block diagram showing an exemplary use case, in accordance with an embodiment of the present invention.

FIG. 3 is a block diagram showing an exemplary use case 300, in accordance with an embodiment of the present invention. The use case is for explaining sensor time series in natural language. In this example, a user provides a multi-variate time series segment 310 in need of explanation. The human-friendly analytics software system 320 generates a set of comment texts 330 for the given time series (showing just one text among many sampled).

Figure 4:
FIG. 4 is a diagram showing an explaining of factors of variations, in accordance with an embodiment of the present invention.
Figure 4:
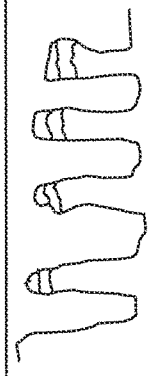

FIG. 4 is a diagram showing an explaining of factors of variations, in accordance with an embodiment of the present invention.

Explaining factors of variations. Starting from a time series 410 and its corresponding generated text 420, a user can manipulate them 410, 420 simultaneously by changing a particular dimension of the latent representation vector 430. The lower part of FIG. 4 illustrates the effect of such manipulation.

Previous works focused on either time series classification or text generation. Embodiments of the present invention are first to address the time series-to-text generation task in an end-to-end manner, addressing both sub-tasks jointly in a single model. It is also the first work to propose a co-disentanglement algorithm, which encourages consistency between the learned factors across two modalities. This algorithm simultaneously addresses the weaknesses of two existing families of methods: (1) VAE-based multimodal data modeling methods whose learned representations lack interpretability; and (2) disentangled representation learning methods that aim to identify factors for a single modality but cannot take advantage of multiple modalities.

Figure 5:
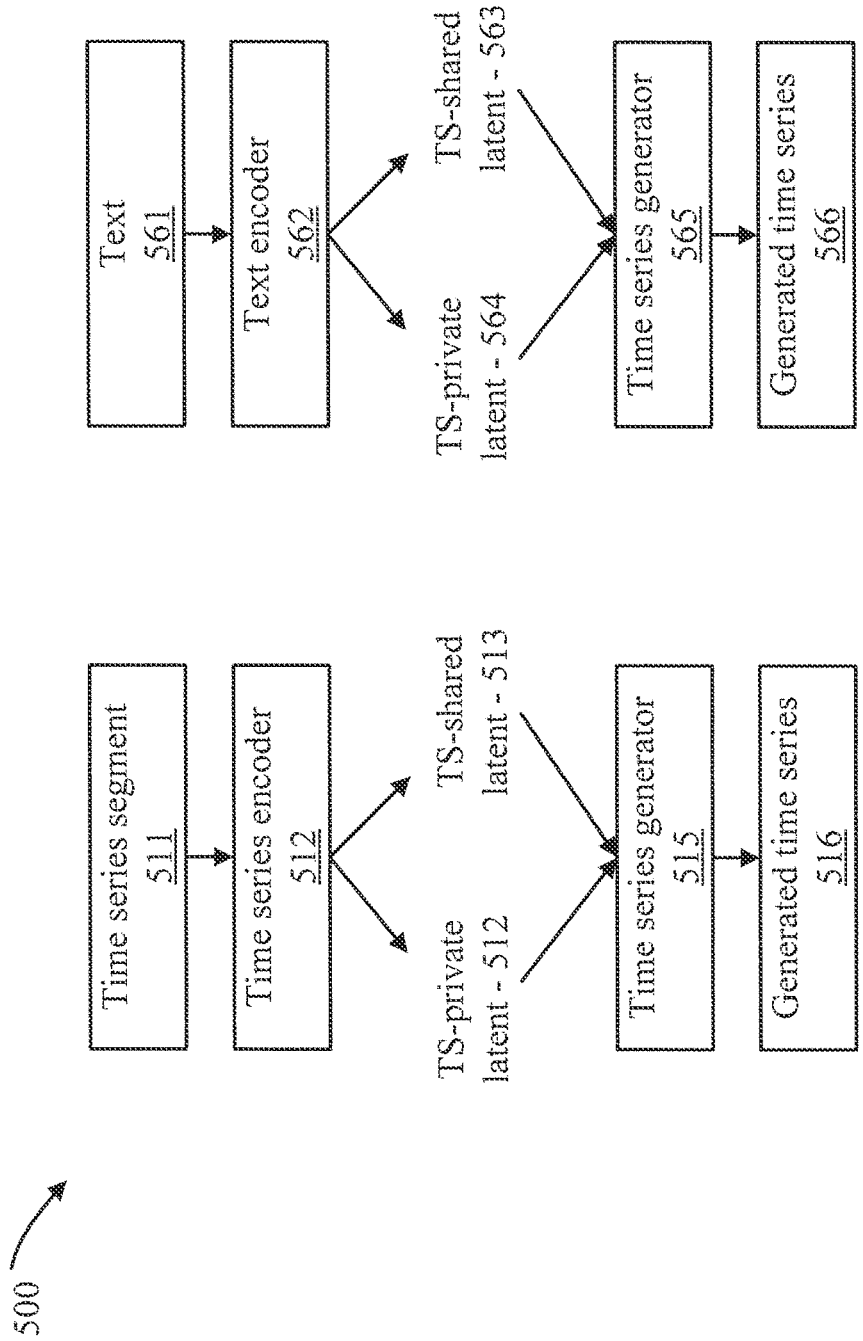
FIG. 5 is a diagram showing an exemplary architecture of a multi-modal VAE, in accordance with an embodiment of the present invention.

FIG. 5 is a diagram showing an exemplary architecture 500 of a multi-modal VAE, in accordance with an embodiment of the present invention.

The architecture 500 includes a time series part 501 and a text part 551.

The time series part 501 receives a time series segment 511 by a time series encoder 512 which outputs a TS-private latent representation 513 and a TS-shared latent representation 514 to a time series generator 515 that, in turn, outputs a generated time series 516.

The text part 551 receives text 561 by a text encoder 562 which outputs a text-shared latent representation 563 and a text-private latent representation 564 to a text generator 565 that, in turn, outputs generated text 566.

FIG. 6 is a diagram showing an exemplary training procedure 600, in accordance with an embodiment of the present invention. The training procedure 600 involves a training dataset 601 having a time series database 601A (of historical sensor data) and text logs 601B with free-form human-written comments.

The training procedure 600 involves data pre-processing 610 including time series augmentation 611 and text augmentation 612.

The training procedure 600 further involves training 620 the multi-modal disentangled VAE by optimizing the described objective using stochastic gradient descent.

FIG. 7 is a diagram showing an exemplary first use case 700, in accordance with an embodiment of the present invention.

A time series segment 701 is received. The time series segment 701 is preprocessed 702. A trained time series encoder 720 outputs a TS-shared latent representation 721 and a TS-private latent representation 722. A trained text generator 730 receives the TS-shared latent representation 721 and the TS-private latent representation 722 and also a test-private latent 731 sampled from previously, and outputs a piece of natural language text 732 that explains the input time series segment 701 for human users.

FIG. 8 is a diagram showing an exemplary second use case 800, in accordance with an embodiment of the present invention.

A time series segment 801 is received for pre-processing 802, and the pre-processed time series is input to a trained time series encoder 810 which outputs a TS-shared latent representation 811 and a TS-private latent representation 812.

A list of example text 821 with a desired style is received for pre-processing 822, and the pre-processed text is then received by a trained text encoder 823 that outputs a text-private latent representation 824. In place of the list of example text 821 to finally obtain the text-private latent representation 824, one can select 825 a text-private latent representation from a list of style latent prototypes to obtain the text-private latent representation 824.

The TS-shared latent representation 811, the TS-private latent representation 812, and the text-private latent representation 824 are input to a trained text generator 830 to output of a piece of natural language 831 in the desired style that explains the input time series.

FIG. 9 is a diagram showing an exemplary third use case 900, in accordance with an embodiment of the present invention.

A time series segment 901 is received for pre-processing 902, and the pre-processed time series is input to a trained time series encoder 910 which outputs a TS-private latent representation 911 and a TS-shared latent representation 912.

A loop 921 is commenced for each dimension i of the shared latent representation to visualize the generated pairs as a function of changing perturbation. To that end, the loop 921 receives time-series 941 resulting from the perturbed latent representation 933 and the explanation text 953 to visualize 959 the generated pairs as a function of changing perturbation.

A loop 931 is commenced for each perturbation from −1 to 1 to perform the following. Add 932 the perturbation to dimension i of TS-shared latent representation to output perturbed TS-shared latent representation 933. Input the TS-private latent representation 911 and the perturbed TS-shared latent representation 933 to a trained time series generator 940 to output a time series 941 resulting from the perturbed latent representation 933. Input the perturbed TS-shared latent representation 933 and a text-private latent representation 951 sampled from prior to a trained text generator 952 to output explanation text 953.

Data analysts obtain 960 insights about the factors of variations in time series and corresponding semantics of each factor.

Data Preprocessing

Acquire a multi-modal dataset consisting of pairs of time series segment and natural language comment text in English. The time series can include more than one representations.

Each time series is normalized by the minimum and maximum values so the new range is between 0 and 1. Augmented copies of each time series are generated by adding Gaussian noise.

The set of available text is augmented by back-translation. Each text is translated to a foreign language and then translated back to English using a machine translation tool such as Google Translate. The resulting text will have the same meaning as the original text but will likely use different words. Using K foreign languages, each text is converted to K rephrased texts with identical semantics. Each rephrased text is associated with the time series to form a new data pair. Each text is tokenized into a token sequence using a tokenizer such as SentencePiece. A start-of-text symbol <s> is inserted at the beginning of the text, and an end-of-text symbol </s> is appended to the end of the text.

The augmented copies of the original time series-text pairs are used to produce additional pairs. In the resulting dataset, denote the number of pairs by n, the i'th data pair by $(x^{(i)}, y^{(i)})$ where $x^{(i)}$ is the time series segment and $y^{(i)}$ is the text.

Network Model Architecture

The multi-modal VAE neural network is illustrated in FIG. 5. It includes (1) a time series encoder 512, (2) a text encoder 562, (3) a time series generator 515 and (4) a text generator 565.

The time series encoder 512 can be implemented as a RNN, a transformer or any sequence model. One possible implementation is a dual-attention RNN for multivariate input series. The time series encoder 512 takes as input a (possibly multivariate) time series segment. At each timestep outputs a hidden state vector that summarizes the accumulated information at each timestep of the time series. The hidden state vector of the last timestep is used as the TS-shared and TS-private latent representation of the input time series segment.

The time series generator 515 can be implemented as a RNN, a transformer or any sequence model. The time series generator 515 takes a pair of shared 513 and private latent representation vectors 514 as the condition, and outputs a (possibly multivariate) time series of a specified length.

The text encoder is a transformer stack. It takes a tokenized text sequence. The output of the last transformer layer at the position of the </s> token is used as the text-shared 563 and text-private latent representations 564.

The text generator 565 is a transformer stack. The text generator 565 takes a pairs of shared 563 and private latent representation vectors 564 as the condition and outputs a token sequence 566. Optionally, it can take a partially completed token sequence as additional input, and output a token sequence where the input is a prefix. The forward passing of the generator 565 works in an autoregressive position-by-position manner. At each position, the embedding of the input token is looked up and passed to the self-attention layer. A subsequent projection layer generates a probability distribution over all tokens in the vocabulary. According to this distribution, a text token is sampled as the output at the current position.

Training

The neural network is trained end-to-end in iterations. At each training iteration, a batch of B time series-text pairs is sampled and the following objective L is computed. The objective is maximized by stochastic gradient descent (SGD).

$$\mathcal{L} = \mathcal{L}_1 + \mathcal{L}_2 + \mathcal{L}_3$$

The complete set of objective can be decomposed into three groups $L_1$, $L_2$ and $L_3$ as follows.

Group 1: Single-modal objectives, $$L_1 = r(x; z^s_X, z^P_X) + r(y; z^s_Y, z^P_Y) + D_{KL}(q(z^s_X|x)\|p(z^s_X)) + D_{KL}(q(z^s_Y|y)\|p(z^s_Y)) + D_{KL}(q(z^P_X|x)\|p(z^P_X)) + D_{KL}(q(z^P_Y|y)\|p(z^P_Y))$$

These include:

Minimizing the reconstruction error of data from the latent representations from same modality's encoder (Terms 1 and 2). Here function r measures the reconstruction error as the following.

The text reconstruction error is computed using the cross entropy. At each position, the cross entropy between the generated token probability distribution and the true token from the training text is computed. This is averaged over each sequence and over the minibatch.

The time series reconstruction error is computed as the mean squared error (MSE) between the input time series and the reconstructed one, both as n-by-T matrices. This is averaged over the minibatch.

Minimizing the KL divergence between latent and standard Gaussian prior (Terms 3-6)

Group 2: Multi-modal objectives, $$L_2 = r(x; z^s_Y, z^P_X) + r(y; z^s_X, z^P_Y) + \mathcal{I}(z^s_X, z^s_Y) - \mathcal{I}(z^s_X, z^P_X) - \mathcal{I}(z^s_Y, z^P_Y)$$

These include:

Minimizing the error of reconstructing one modality's data using the other modality's shared latent representation (Terms 1 and 2)

Maximizing the mutual information between the two shared representations in both modalities. (term 3). Here I denotes mutual information between two random variables. The mutual information is estimated using the NWJ lower bound.

Minimizing the mutual information between shared and private component of the representation (term 4 and 5). The mutual information is estimated using the CLUB upper bound.

Group 3: Factor disentanglement objectives $$L_3 = -TC(f_X^1, \ldots, f_X^K) + -TC(f_Y^1, \ldots, f_Y^K) + \sum_{i=1}^{K} I(f_X^i, f_Y^i)$$

These include:

Minimizing the total correlation between the factors in the representation of each modality (terms 1 and 2). Here TC denotes total correlation between multiple random variables.

Maximizing mutual information between matched factor pairs across modalities (term 3). The mutual information is estimated using the NWJ lower bound.

Training a randomly initialized network using the complete set of objectives can be difficult as optimization is likely to get stuck in the many local optima at the beginning. We adopt a three-stage warm-start approach to alleviate this difficulty. The training proceeds in three stages:

At stage 1, only the single-modal objectives are trained. This stage lasts for e.g. 1000 iterations.

At stage 2, the multi-modal objectives are added. This stage lasts for e.g. another 1000 iterations.

At stage 3, the factor disentanglement objectives are further added. This stage lasts until convergence.

In stage 1, in each iteration, a minibatch of data (B time series-text pairs) is sampled and stochastic gradient descent (SGD) is used to update the parameters of encoders/decoders. In stage 2 and 3, we alternate updating the encoders/decoders with updating the estimators. After each iteration of encoder/decoders update, we perform 5 iterations of estimator update.

In training the text generator, a mixture of teacher-forcing and free-running training modes is used to improve the generation quality. After the text generator outputs each token, we randomly choose one of these two modes to determine the input at the next position. In teacher forcing mode, the input at the next position is the true token at that position in the training text. In the free-running mode, a token is sampled from the vocabulary according to the output distribution of the current position, and used as the input at the next position.

Use Case 1: Generating Text Explanation from an Input Time Series (without Particular Text Style)—FIG. 7

A time series segment 701 that the user wants explanation is preprocessed and passed through the trained time series encoder 720. The shared latent 721, in combination with a text-private latent sampled 731 from a standard Gaussian prior, are fed into the trained text generator 730 as condition. The initial input to the text generator 730 is the start-of-text symbol <s>. Free-running mode is used and the sampled output token at each position is used as the input for the next position. This dynamic decoding process repeats until a </s> symbol is generated. The generated token sequence is joined to form a text string that will be returned to the user. Repeated samplings can generate a diverse set of texts.

Use Case 2: Generating Text Explanation from an Input Time Series (with Particular Text Style)—FIG. 8

The procedure is similar to the first use case, except that the text-private latent is obtained in a different way.

If the user has one or more reference texts with the desired style, these texts can be fed into the trained text encoder 823, and the mean of the resulting text-private latent representations is used. The user can also select from a list of text-private representations that are known to correspond to a particular style. Such a list can be pre-trained using a curated corpus of texts in different styles.

Use Case 3: Explaining Factors of Variation—FIG. 9

One can use the trained model to analyze what the latent factors of variations in the dataset are, and understand the manifestation of each factor in terms of time series and of text. The user selects a time series segment as reference. This time series segment is fed to the trained time series encoder and the TS-private and TS-shared latent vectors are obtained. We perturb each dimension of the TS-shared latent vector with a range of magnitudes. For each perturbed dimension and each perturbation magnitude, we feed the new TS-shared latent, together with the original TS-private latent to the trained time series generator to obtain a new time series. We also feed the new TS-shared latent, together with a text-private latent sampled from a standard Gaussian prior, to the trained text generator to obtain a new text. The collection of pairs of new time series and new texts from each perturbation are visualized. Such visualization provides human data analysts with insights about the semantics and quantitative effect of each factor of variation in their domain data.

Figure 10:
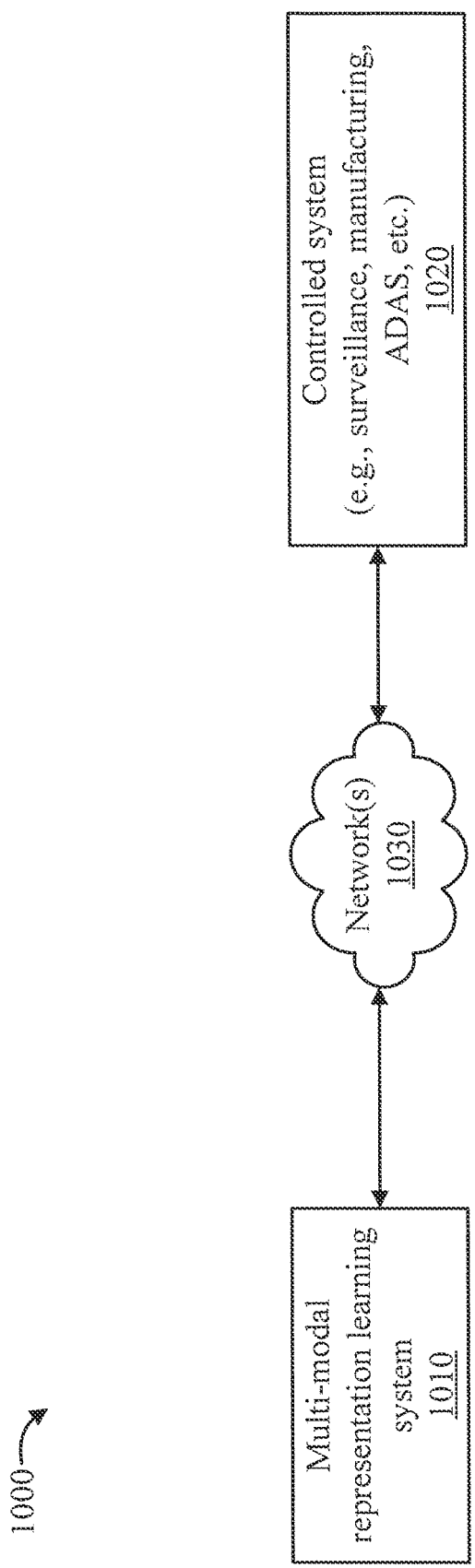
FIG. 10 is a block diagram showing an exemplary environment to which the present invention can be applied, in accordance with an embodiment of the present invention.

FIG. 10 is a block diagram showing an exemplary environment 1000 to which the present invention can be applied, in accordance with an embodiment of the present invention.

The environment 1000 includes a multi-modal representation learning system 1010 and a controlled system 1020. The multi-modal representation learning system 1010 and the controlled system 1020 are configured to enable communications therebetween. For example, transceivers and/or other types of communication devices including wireless, wired, and combinations thereof can be used. In an embodiment, communication between the multi-step-ahead forecasting system 1010 and the controlled system 1020 can be performed over one or more networks, collectively denoted by the figure reference numeral 1030. The communication can include, but is not limited to, multi-variate time series data from the controlled system 1020, and forecasts and action initiation control signals from the multi-step-ahead forecasting system 1010. The controlled system 1020 can be any type of processor-based system such as, for example, but not limited to, a surveillance system, a manufacturing system (e.g., an assembly line), an Advanced Driver-Assistance System (ADAS), and so forth.

The controlled system 1020 provides data (e.g., multi-variate time-series data) to the multi-step-ahead forecasting system 1010 which uses the data to generate text explanations of the time series data.

The controlled system 1020 can be controlled based on an explanation generated by the multi-modal representation learning system 1010. For example, based on an explanation indicating that a machine will fail in x time steps, a corresponding action (e.g., power down machine, enable machine safeguard to prevent injury/etc., and/or so forth) can be performed at t<x in order to avoid the failure from actually occurring. As another example, based on a trajectory of an intruder, a surveillance system being controlled could lock or unlock one or more doors in order to secure someone in a certain place (holding area) and/or guide them to a safe place (safe room) and/or restrict them from a restricted place and/or so forth. Verbal (from a speaker) or displayed (on a display device) instructions could be provided along with the locking and/or unlocking of doors (or other actions) in order to guide a person. As a further example, a vehicle can be controlled (braking, steering, accelerating, and so forth) to avoid an obstacle that is predicted to be in a car's way responsive to an explanation. As a yet further example, the present invention can be incorporated into a computer system in order to forecast impending failures and take action before the failures occur, such as switching a component that will soon fail with another component, routing through a different component, processing by a different component, and so forth. It is to be appreciated that the preceding actions are merely illustrative and, thus, other actions can also be performed depending upon the implementation, as readily appreciated by one of ordinary skill in the art given the teachings of the present invention provided herein, while maintaining the spirit of the present invention.

In an embodiment, the multi-modal representation learning system 1010 can be implemented as a node in a cloud-computing arrangement. In an embodiment, a single multi-modal representation learning system 1010 can be assigned to a single controlled system or to multiple controlled systems e.g., different robots in an assembly line, and so forth). These and other configurations of the elements of environment 1000 are readily determined by one of ordinary skill in the art given the teachings of the present invention provided herein, while maintaining the spirit of the present invention.

Figure 11:
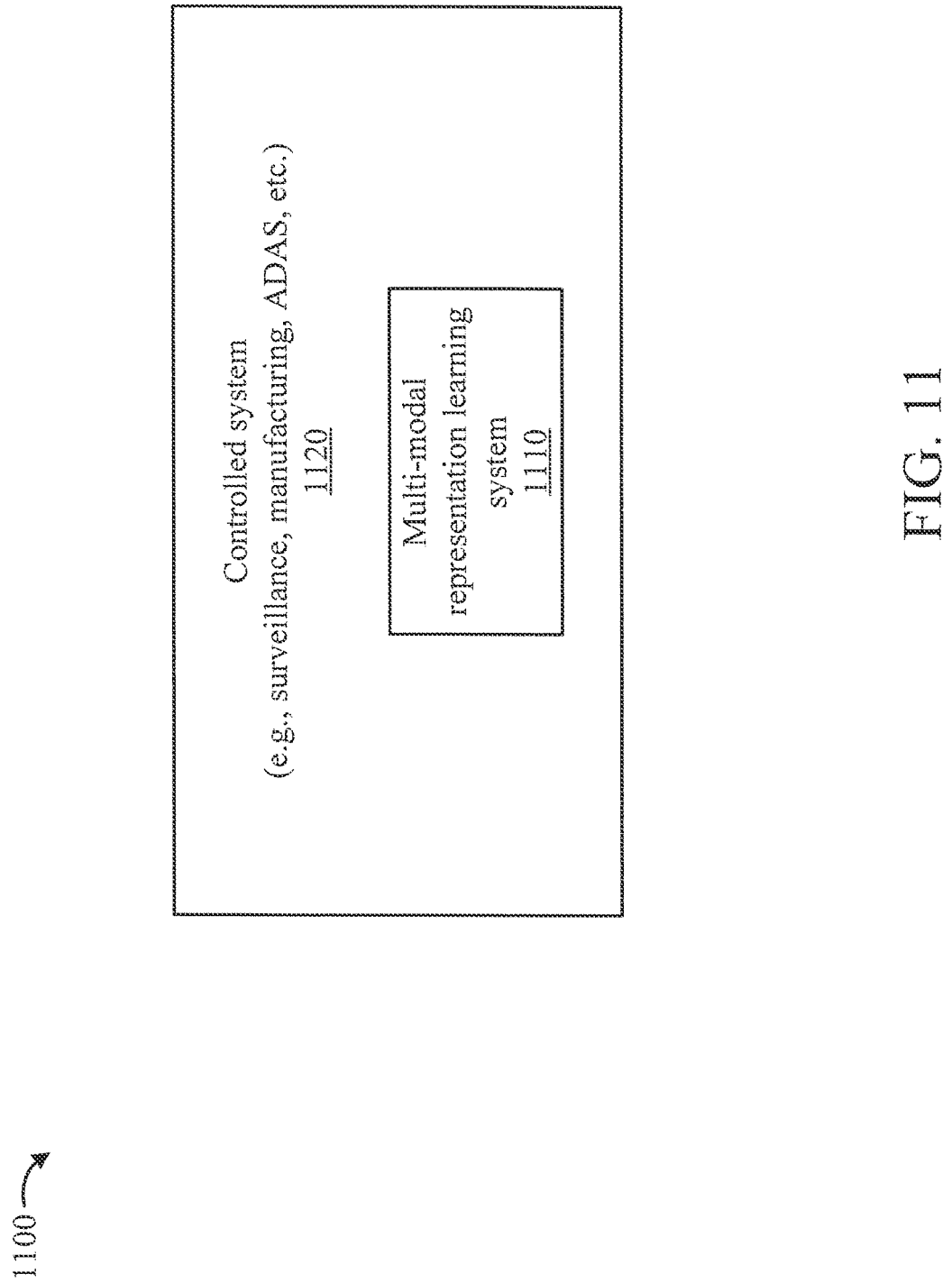
FIG. 11 is a block diagram showing another exemplary environment to which the present invention can be applied, in accordance with an embodiment of the present invention.

FIG. 11 is a block diagram showing another exemplary environment 1100 to which the present invention can be applied, in accordance with an embodiment of the present invention.

The environment 1100 includes a controlled system 1120 that, in turn, includes a multi-modal representation learning system 1110. One or more communication buses and/or other devices can be used to facilitate inter-system, as well as intra-system, communication. The controlled system 1120 can be any type of processor-based system such as, for example, but not limited to, a surveillance system, a manufacturing system (e.g., an assembly line), an Advanced Driver-Assistance System (ADAS), and so forth.

Other than system 1110 being included in system 1120, operations of these elements in environments 1100 and 1100 are similar. Accordingly, elements 1110 and 1120 are not described in further detail relative to FIG. 11 for the sake of brevity, with the reader respectively directed to the descriptions of elements 1110 and 1120 relative to environment 1000 of FIG. 10 given the common functions of these elements in the two environments 1000 and 1100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for multi-model representation learning, comprising:
    encoding, by a trained time series (TS) encoder, an input TS segment into a TS-shared latent representation and a TS-private latent representation; and
    generating, by a trained text generator, a natural language text that explains the input TS segment, responsive to the TS-shared latent representation, the TS-private latent representation, and a text-private latent representation.

2. The computer-implemented method of claim 1, wherein the text-private latent representation is obtaining by inputting a list of example texts with a desired style into a trained text encoder which outputs the text-private latent representation in response thereto.

3. The computer-implemented method of claim 2, further comprising pre-processing the example texts by translating each of the example texts into a foreign language and translating back using a different translation tool to obtain resultant text with a same meaning but different words for use as the list of example texts.

4. The computer-implemented method of claim 1, wherein the text-private latent representation is selected from a list of style latent prototypes.

5. The computer-implemented method of claim 1, wherein the natural language text that explains the input TS segment is in a user-selected style.

6. The computer-implemented method of claim 1, further comprising pre-processing the input TS segment by normalizing the input TS segment to have values from 0 to 1, and augmenting the normalized TS segment by adding Gaussian noise to the normalized TS segment.

7. The computer-implemented method of claim 1, further comprising:
    adding a perturbation to dimension i of the TS-shared latent representation; and
    visualizing generated pairs of TS and text as a function of changing perturbation for each dimension i of the TS-shared latent variable.

8. The computer-implemented method of claim 1, wherein a hidden state vector of a last timestep is used as the TS-shared latent representation and the TS-private latent representation of the TS segment.

9. The computer-implemented method of claim 1, further comprising controlling an operating parameter of a motorized device to prevent an impending device failure responsive to the natural language text that explains the input TS segment.

10. A computer program product for multi-model representation learning, the computer program product comprising a non-transitory computer readable storage medium having program instructions embodied therewith, the program instructions executable by a computer to cause the computer to perform a method comprising:

encoding, by a trained time series (TS) encoder, an input TS segment into a TS-shared latent representation and a TS-private latent representation; and generating, by a trained text generator, a natural language text that explains the input TS segment, responsive to the TS-shared latent representation, the TS-private latent representation, and a text-private latent representation.

11. The computer program product of claim 10, wherein the text-private latent representation is obtaining by inputting a list of example texts with a desired style into a trained text encoder which outputs the text-private latent representation in response thereto.

12. The computer program product of claim 11, further comprising pre-processing the example texts by translating each of the example texts into a foreign language and translating back using a different translation tool to obtain resultant text with a same meaning but different words for use as the list of example texts.

13. The computer program product of claim 10, wherein the text-private latent representation is selected from a list of style latent prototypes.

14. The computer program product of claim 10, wherein the natural language text that explains the input TS segment is in a user-selected style.

15. The computer program product of claim 10, further comprising pre-processing the input TS segment by normalizing the input TS segment to have values from 0 to 1, and augmenting the normalized TS segment by adding Gaussian noise to the normalized TS segment.

16. The computer program product of claim 10, further comprising:

adding a perturbation to dimension i of the TS-shared latent representation; and visualizing generated pairs of TS and text as a function of changing perturbation for each dimension i of the TS-shared latent variable.

17. The computer program product of claim 10, wherein a hidden state vector of a last timestep is used as the TS-shared latent representation and the TS-private latent representation of the TS segment.

18. The computer program product of claim 10, further comprising controlling an operating parameter of a motorized device to prevent an impending device failure responsive to the natural language text that explains the input TS segment.

19. A computer processing system for multi-model representation learning, comprising:

a memory device for storing program code; and a hardware processor operatively coupled to the memory device for running the program code to:

encode, using a trained time series (TS) encoder, an input TS segment into a TS-shared latent representation and a TS-private latent representation; and generate, using a trained text generator, a natural language text that explains the input TS segment, responsive to the TS-shared latent representation, the TS-private latent representation, and a text-private latent representation.

20. The computer processing system of claim 19, wherein the text-private latent representation is obtaining by inputting a list of example texts with a desired style into a trained text encoder which outputs the text-private latent representation in response thereto.

* * * * *